United States Patent
Rogers et al.

(10) Patent No.: US 7,847,830 B2
(45) Date of Patent: Dec. 7, 2010

(54) SYSTEM AND METHOD FOR CAMERA METERING BASED ON FLESH TONE DETECTION

(75) Inventors: Terrence E. Rogers, Durham, NC (US); Jason M. Cope, Durham, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 495 days.

(21) Appl. No.: 11/561,906

(22) Filed: Nov. 21, 2006

(65) Prior Publication Data

US 2008/0117305 A1    May 22, 2008

(51) Int. Cl.
| | |
|---|---|
| H04N 5/228 | (2006.01) |
| G03B 7/00 | (2006.01) |
| H04N 5/235 | (2006.01) |
| H04N 5/238 | (2006.01) |

(52) U.S. Cl. ............... 348/222.1; 348/362; 348/364
(58) Field of Classification Search ........... 348/222.1, 348/362–366
See application file for complete search history.

(56) References Cited

U.S. PATENT DOCUMENTS

| 5,430,809 | A * | 7/1995 | Tomitaka ............ 382/173 |
|---|---|---|---|
| 6,940,545 | B1 * | 9/2005 | Ray et al. ............ 348/222.1 |
| 2004/0119851 | A1 * | 6/2004 | Kaku ............ 348/239 |
| 2006/0082665 | A1 * | 4/2006 | Mizukura et al. ............ 348/272 |
| 2007/0024718 | A1 * | 2/2007 | Yu et al. ............ 348/222.1 |
| 2007/0036438 | A1 * | 2/2007 | Thakur ............ 382/190 |
| 2007/0052840 | A1 * | 3/2007 | Okuno ............ 348/364 |
| 2008/0225130 | A1 * | 9/2008 | Paaaho et al. ............ 348/222.1 |

FOREIGN PATENT DOCUMENTS

| EP | 1128316 | 8/2001 |
|---|---|---|
| JP | 2003107555 | 4/2003 |

OTHER PUBLICATIONS

International Preliminary Report on Patentability from corresponding International Application No. PCT/US07/70064.
Birgitta Martinkauppi, Maricor Soriano and Matti Pietikainen, Detection of Skin Color under Changing Illumination: A Comparative Study, Proceedings of the 12th International Conference on Image Analysis and Processing (ICIAP'03), IEEE Computer Society, 2003.
Birgitta Martinkauppi, Face Colour Under Varying Illumination—Analysis and Applications, Academic Dissertation, Department of Electrical and Information Engineering and Infotech, University of Oulu, Finland, 2002.
Chapter 6, Facial Skin Color Modeling by J. Birgitta Martinkauppi and Matti Pietikainen, excerpted from Stan Z. Li and Anil K. Jain, Handbook of Face Recognition, Springer Science & Business Media, Inc., 2005.
International Search Report and Written Opinion from corresponding International Application No. PCT/US06/42880.

* cited by examiner

*Primary Examiner*—Sinh Tran
*Assistant Examiner*—Christopher K Peterson
(74) *Attorney, Agent, or Firm*—Renner, Otto, Boisselle & Sklar, LLP

(57) ABSTRACT

A method of adjusting exposure settings for a digital camera includes searching at least a portion of the field of view of the camera for pixels having a flesh tone. The flesh tone pixels are analyzed to identify at least one flesh tone spot. Spot metering of the field of view of the camera is carried out such that at least one flesh tone spot is given greater weight than the rest of the field of view. Then, the exposure settings are adjusted based on the spot metering.

20 Claims, 4 Drawing Sheets

SYSTEM AND METHOD FOR CAMERA METERING BASED ON FLESH TONE DETECTION

TECHNICAL FIELD OF THE INVENTION

The present invention relates generally to photography and, more particularly, to a system and method for camera metering based on flesh tone detection.

DESCRIPTION OF THE RELATED ART

Exposures settings of a digital camera may be based on spot metering. A typical spot metering technique includes monitoring illumination levels across some or all of the entire field of view of the camera. The illumination levels are integrated together to assess the illumination conditions and adjust exposure settings, such as flash intensity (if a flash is to be used at all), f-stop, shutter speed and so forth. During the integration of illumination levels, a fixed region or regions of the field of view of the camera are given greater weight. For instance, a center rectangular section of the scene may be given greater weight than the rest of the field of view under the theory that camera users tend to center the desired target of a photograph in the center of the camera's field of view.

There are some situations where spot metering is not effective. For instance, if the user intends to take a photograph of people and there is dark subject matter appearing in the metered spot (e.g., dark foliage of trees behind the people posing for a photograph), the camera may sense that the photograph is of a dark scene and set the exposure settings accordingly. As a result, the faces of the people may become over-exposed. Similarly, the faces may be under-exposed if there is bright subject matter appearing in the metered spot. In both situations, relatively unimportant details (e.g., the foliage from the prior example) may be well-imaged, but the faces in resulting photographs may be too bright (e.g., "washed-out" looking) or too dark. Area metering techniques suffer from the same issues.

Additionally, most digital cameras employ an analog gain adjustment to make the imaged scene "fill" the dynamic range of an analog to digital converter (ADC). Many ADCs have a limited range (e.g., about an 8 bit word) for reasons of cost, sensitivity, size and speed. Facial details have a tendency to become dynamically compressed in the range of the ADC if the metering results in imaging of the faces as dark or light areas. In particular, spot metering techniques, area metering techniques and combined spot and area metering techniques often fail to dynamically center faces in the ADC range since, when taking a picture of one or more persons, the face(s) may not be in the spot used for spot metering and/or the face(s) may not consume a large enough region to effectively influence area metering and/or the camera selects the wrong metering approach (if applicable to the camera). Thus, the metering may fail to adjust exposure settings for quality imaging of people present in the field of view of the camera. Post processing is sometimes used to improve dynamically compressed portions of photographs, but sharpness is typically not restorable once data is lost due to the compression and the post processing is known to introduce noise.

Some cameras allow for manual adjustment of exposure settings to optimize facial detail. But most camera users are unfamiliar with what actions to take to manually adjust camera settings.

SUMMARY

To improve the quality of photographs, there is a need in the art for a system and method for automated camera metering that leads to improved image quality of people appearing in photographs. In accordance with certain aspect of the invention, flesh tone detection is used to drive camera metering so that faces and people appearing in photographs will have a high degree of detail and sharpness.

According to one aspect of the invention, a method of adjusting exposure settings for a digital camera includes searching at least a portion of the field of view of the camera for pixels having a flesh tone; analyzing flesh tone pixels to identify at least one flesh tone spot; conducting spot metering of the field of view of the camera such that at least one flesh tone spot is given greater weight than the rest of the field of view; and adjusting the exposure settings based on the spot metering.

According to one embodiment of the method, the analyzing of the flesh tone pixels includes grouping the flesh tone pixels by relative proximity to each other.

According to one embodiment of the method, an area of the flesh tone spot has at least a threshold percentage of flesh tone pixels.

According to one embodiment, the method further includes reducing the size of the flesh tone spot prior to conducting the spot metering.

According to one embodiment, the method further includes converting an RGB output of a sensor that images the field of view to a coordinate-based color value for each pixel.

According to one embodiment of the method, the flesh tone is defined by a predetermined portion of a coordinate-based color space.

According to one embodiment of the method, the predetermined portion of the coordinate-based color space is elliptical.

According to one embodiment of the method, the elliptical portion of the coordinate-based color space is approximated with a set of rectangles.

According to one embodiment, the method further includes iteratively adjusting the exposure settings from darker to lighter until flesh tone saturation is detected.

According to one embodiment, the method further includes, upon detection of flesh tone saturation, reversing at least a portion of the iterative adjustments.

According to another aspect of the invention, a camera includes a sensor for imaging a field of view and outputting a signal indicative of luminance and color for a plurality of pixels; and a controller that adjusts exposure settings of the camera by identifying which pixels have a flesh tone, analyzing the flesh tone pixels to identify at least one flesh tone spot, conducting spot metering of the field of view such that at least one flesh tone spot is given greater weight than the rest of the field of view and adjusting the exposure settings based on the spot metering.

According to one embodiment of the camera, the controller executes logical instructions to adjust the exposure settings.

According to one embodiment of the camera, the analyzing of the flesh tone pixels by the controller includes grouping the flesh tone pixels by relative proximity to each other.

According to one embodiment of the camera, an area of the flesh tone spot has at least a threshold percentage of flesh tone pixels.

According to one embodiment of the camera, the controller reduces the size of the flesh tone spot prior to conducting the spot metering.

According to one embodiment of the camera, the output of the sensor has an RGB value set for each pixel and the controller converts the RGB output of a sensor to a coordinate-based color value for each pixel.

According to one embodiment of the camera, the flesh tone is defined by a predetermined portion of a coordinate-based color space.

According to one embodiment of the camera, the controller iteratively adjusts the exposure settings from darker to lighter until flesh tone saturation is detected.

According to one embodiment of the camera, upon detection of flesh tone saturation, the controller reverses at least a portion of the iterative adjustments.

According to one embodiment of the camera, the camera forms part of a mobile radio terminal having a radio circuit for establishing a call over a communications network.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the terms "comprises" and "comprising," when used in this specification, are taken to specify the presence of stated features, integers, steps or components but do not preclude the presence or addition of one or more other features, integers, steps, components or groups thereof.

DETAILED DESCRIPTION OF EMBODIMENTS

Figure 1:
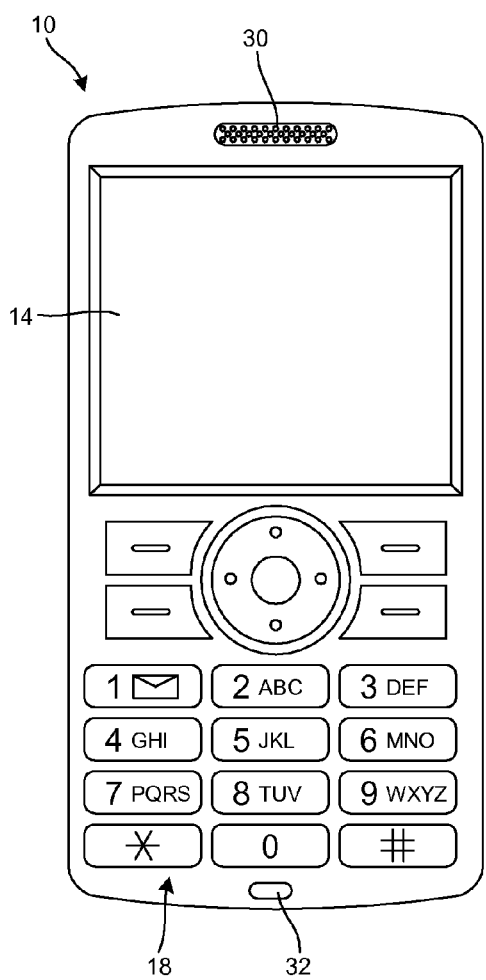
FIG. 1 is a schematic front view of a mobile telephone that has a camera assembly as an exemplary electronic device in accordance with an embodiment of the present invention.

Embodiments of the present invention will now be described with reference to the drawings, wherein like reference numerals are used to refer to like elements throughout. It will be understood that the figures are not necessarily to scale.

Aspects of the invention relate to photography. The techniques described herein may be applied to taking photographs with a digital still camera and to taking video with a digital video camera. It will be appreciated that some digital cameras are capable of taking both still images and video. The techniques described herein also may be used in conjunction with a film camera, if the camera is equipped with a suitable sensor for detecting flesh tones as described herein.

The techniques described herein may be carried out by any type of electronic device that includes a camera. For instance, a dedicated still and/or video digital camera may be constructed in accordance with the present invention.

As another example, many mobile telephones include cameras that may be constructed in accordance with the present invention. By way of example, the following description is made in the context of a mobile telephone that includes a camera assembly. However, it will be appreciated that the invention is not intended to be limited to the context of a mobile telephone and may relate to any type of appropriate electronic equipment, examples of which include a dedicated camera, a media player that includes a camera, a gaming device that includes a camera and a computer that includes a camera. For purposes of the description herein, the interchangeable terms "electronic equipment" and "electronic device" include portable radio communication equipment. The term "portable radio communication equipment," which herein after is referred to as a "mobile radio terminal," includes all equipment such as mobile telephones, pagers, communicators, electronic organizers, personal digital assistants (PDAs), smartphones, portable communication apparatus or the like.

Figure 2:
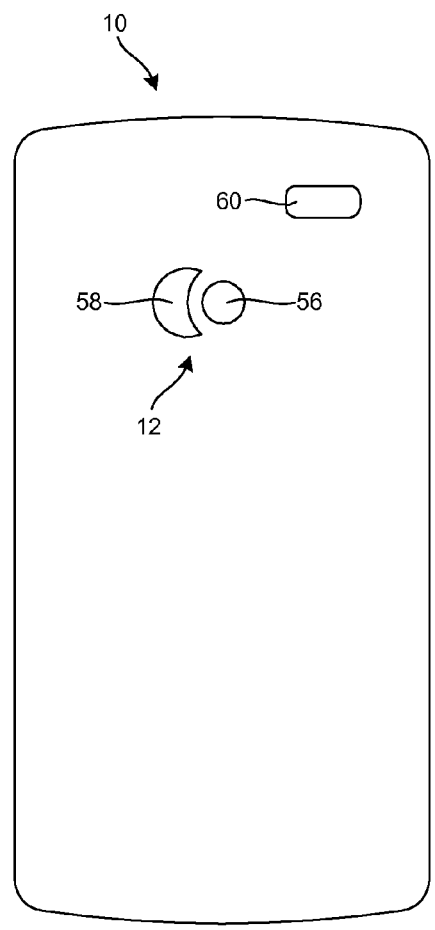
FIG. 2 is a schematic rear view of the mobile telephone of FIG. 1.
Figure 3:
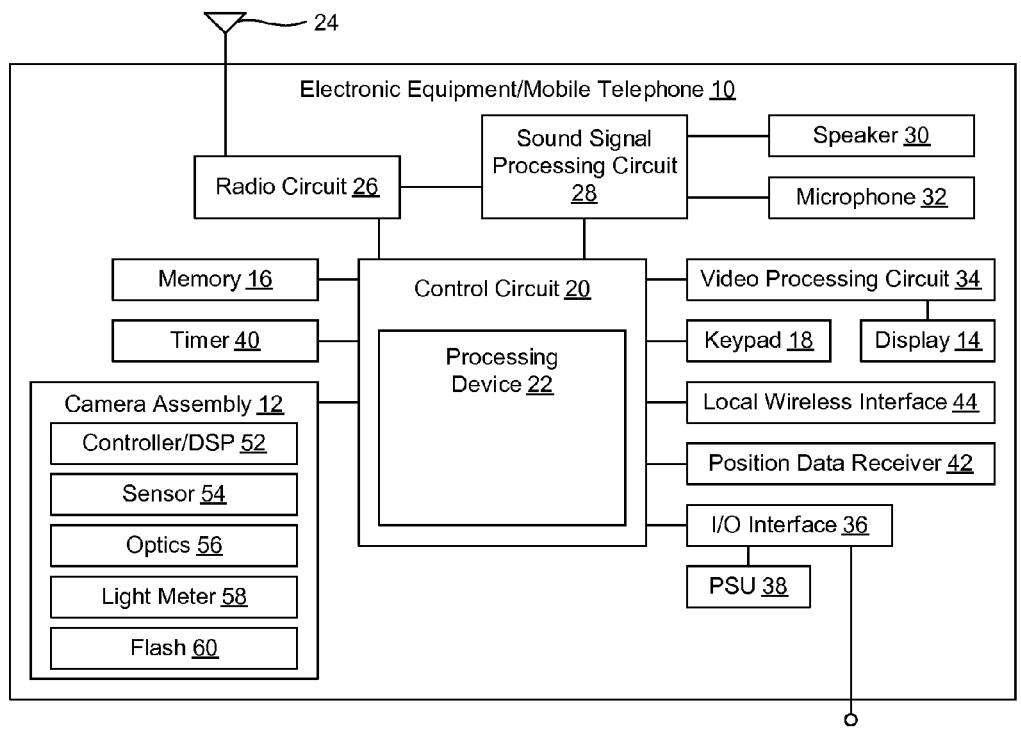
FIG. 3 is a schematic block diagram of operative portions of the mobile telephone of FIG. 1.

Referring initially to FIGS. 1 through 3, an electronic device 10 is shown. The electronic device 10 includes a camera assembly 12 that is configured to conduct metering and adjust exposure settings based on flesh tones present in a field of view of the camera. Additional details and operation of the camera assembly 12 will be described in greater detail below. The techniques for metering described herein may be embodied as executable code that is resident in and executed by the electronic device 10. In one embodiment, the camera assembly 12 and/or the electronic device 10 may include a controller or processor that executes a program stored on a computer or machine readable medium. The program may be a stand-alone software application or form a part of a software application that carries out additional tasks related to the electronic device 10.

The electronic device of the illustrated embodiment is a mobile telephone and will be referred to as the mobile telephone 10. The mobile telephone 10 is shown as having a "brick" or "block" form factor housing, but it will be appreciated that other type housings, such as a clamshell housing (e.g., a "flip" open housing) or a slide-type housing, may be utilized.

The mobile telephone 10 may include a display 14. The display 14 displays information to a user such as operating state, time, telephone numbers, contact information, various navigational menus, etc., which enable the user to utilize the various features of the mobile telephone 10. The display 14 also may be used to visually display content received by the mobile telephone 10 and/or retrieved from a memory 16 (FIG. 3) of the mobile telephone 10. The display 14 may be used to present images, video and other graphics to the user, such as photographs, mobile television content and video associated with games. Also, the display 14 may be used as an electronic viewfinder for the camera assembly 12.

A keypad 18 provides for a variety of user input operations. For example, the keypad 18 typically includes alphanumeric keys for allowing entry of alphanumeric information such as telephone numbers, phone lists, contact information, notes, etc. In addition, the keypad 18 typically includes special function keys such as a "call send" key for initiating or answering a call, and a "call end" key for ending or "hanging up" a call. Special function keys also may include menu navigation and select keys to facilitate navigating through a menu displayed on the display 16. Special function keys may include audiovisual content playback keys to start, stop and pause playback, skip or repeat tracks, and so forth. Other keys associated with the mobile telephone may include a volume key, an audio mute key, an on/off power key, a web browser launch key, etc. Some or all of the keys may be used in conjunction with the display as soft keys. Keys or key-like functionality also may be embodied as a touch screen associated with the display 14. When the camera assembly 12 is activated, keys from the keypad 18 may be used control operation of the camera assembly 12. For instance, one of the keys may serve as a shutter key and other keys may control the zoom of the camera assembly.

The mobile telephone 10 includes call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi, WiMax, etc. Another example includes a video enabled call that is established over a cellular or alternative network.

The mobile telephone 10 may be configured to transmit, receive and/or process data, such as text messages (e.g., colloquially referred to by some as "an SMS," which stands for simple message service), electronic mail messages, multimedia messages (e.g., colloquially referred to by some as "an MMS," which stands for multimedia message service), image files, video files, audio files, ring tones, streaming audio, streaming video, data feeds (including podcasts) and so forth. Processing such data may include storing the data in the memory 16, executing applications to allow user interaction with data, displaying video and/or image content associated with the data, outputting audio sounds associated with the data and so forth.

FIG. 3 represents a functional block diagram of the mobile telephone 10. For the sake of brevity, generally conventional features of the mobile telephone 10 will not be described in great detail herein. The mobile telephone 10 includes a primary control circuit 20 that is configured to carry out overall control of the functions and operations of the mobile telephone 10. The control circuit 20 may include a processing device 22, such as a CPU, microcontroller or microprocessor. The processing device 22 executes code stored in a memory (not shown) within the control circuit 20 and/or in a separate memory, such as the memory 16, in order to carry out operation of the mobile telephone 10. The memory 16 may be, for example, one or more of a buffer, a flash memory, a hard drive, a removable media, a volatile memory, a non-volatile memory or other suitable device.

Continuing to refer to FIGS. 1 through 3, the mobile telephone 10 includes an antenna 24 coupled to a radio circuit 26. The radio circuit 26 includes a radio frequency transmitter and receiver for transmitting and receiving signals via the antenna 24 as is conventional. The radio circuit 26 may be configured to operate in a mobile communications system and may be used to send and receive data and/or audiovisual content. Receiver types for interaction with a mobile radio network and/or broadcasting network include, but are not limited to, GSM, CDMA, WCDMA, GPRS, MBMS, WiFi, WiMax, DVB-H, ISDB-T, etc., as well as advanced versions of these standards.

The mobile telephone 10 further includes a sound signal processing circuit 28 for processing audio signals transmitted by and received from the radio circuit 26. Coupled to the sound processing circuit 28 are a speaker 30 and a microphone 32 that enable a user to listen and speak via the mobile telephone 10 as is conventional. The radio circuit 26 and sound processing circuit 28 are each coupled to the control circuit 20 so as to carry out overall operation. Audio data may be passed from the control circuit 20 to the sound signal processing circuit 28 for playback to the user. The audio data may include, for example, audio data from an audio file stored by the memory 16 and retrieved by the control circuit 20, or received audio data such as in the form of streaming audio data from a mobile radio service. The sound processing circuit 28 may include any appropriate buffers, decoders, amplifiers and so forth.

The display 14 may be coupled to the control circuit 20 by a video processing circuit 34 that converts video data to a video signal used to drive the display 14. The video processing circuit 34 may include any appropriate buffers, decoders, video data processors and so forth. The video data may be generated by the control circuit 20, retrieved from a video file that is stored in the memory 16, derived from an incoming video data stream received by the radio circuit 28 or obtained by any other suitable method.

The mobile telephone 10 may further include one or more I/O interface(s) 36. The IO interface(s) 36 may be in the form of typical mobile telephone I/O interfaces and may include one or more electrical connectors. As is typical, the I/O interface(s) 36 may be used to couple the mobile telephone 10 to a battery charger to charge a battery of a power supply unit (PSU) 38 within the mobile telephone 10. In addition, or in the alternative, the I/O interface(s) 36 may serve to connect the mobile telephone 10 to a headset assembly (e.g., a personal handsfree (PHF) device) that has a wired interface with the mobile telephone 10. Further, the I/O interface(s) 36 may serve to connect the mobile telephone 10 to a personal computer or other device via a data cable for the exchange of data. The mobile telephone 10 may receive operating power via the I/O interface(s) 36 when connected to a vehicle power adapter or an electricity outlet power adapter.

The mobile telephone 10 also may include a timer 40 for carrying out timing functions. Such functions may include timing the durations of calls, generating the content of time and date stamps, etc. The mobile telephone 10 also may include a position data receiver 42, such as a global positioning system (GPS) receiver, Galileo satellite system receiver or the like.

The mobile telephone 10 also may include a local wireless interface 44, such as an infrared transceiver and/or an RF adaptor (e.g., a Bluetooth adapter), for establishing communication with an accessory, another mobile radio terminal, a computer or another device. For example, the local wireless interface 44 may operatively couple the mobile telephone 10 to a headset assembly (e.g., a PHF device) in an embodiment where the headset assembly has a corresponding wireless interface.

Figure 4:
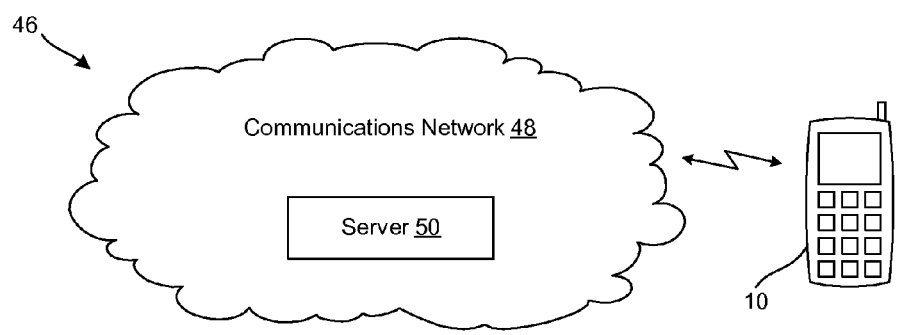
FIG. 4 is a schematic diagram of a communications system in which the mobile telephone of FIG. 1 may operate.

With additional reference to FIG. 4, the mobile telephone 10 may be configured to operate as part of a communications system 46. The system 46 may include a communications network 48 having a server 50 (or servers) for managing calls placed by and destined to the mobile telephone 10, transmitting data to the mobile telephone 10 and carrying out any other support functions. The server 50 communicates with the mobile telephone 10 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 48 may support the communications activity of multiple mobile telephones 10 and other types of end user devices. As will be appreciated, the server 50 may be configured as a typical computer system used to carry out server functions and may include a processor configured to execute software containing logical instructions that embody the functions of the server 50 and a memory to store such software.

With continuing reference to FIGS. 1 through 3, the camera assembly 12 may include a controller 52, such as a digital signal processor (DSP). In other embodiments, some or all of the camera assembly 12 control functions that are described as being carried out by the controller 52 may be carried out by the control circuit 20 and the controller 52 may be downsized or omitted. The controller 52 controls various aspects of camera assembly 12 operation including, but not limited to, metering operations and management of exposure settings. The controller 52 may coordinate storage of image and/or video data captured with camera assembly 12. For instance, the image and/or video data may be stored by the memory 16 in corresponding image files and/or video files.

The controller 52 may execute code to implement the camera assembly 12 control functions. It will be apparent to a person having ordinary skill in the art of computer programming, and specifically in application programming for camera, mobile telephones or other electronic devices, how to program a camera and/or mobile telephone to operate and carry out logical functions associated with the control of the camera assembly 12. Accordingly, details as to specific programming code have been left out for the sake of brevity. Also, while such code is executed by the controller 52 in accordance with a preferred embodiment of the invention, such functionality could also be carried out via dedicated hardware, firmware, software, or combinations thereof, without departing from the scope of the invention.

In the illustrated embodiment, the camera assembly 12 is a digital camera that uses a sensor 54 to image a field of view as determined by imaging optics 56 of the camera assembly. A light meter 58 may detect illumination conditions across the field of view. A flash 60 may be present to offer supplemental illumination during taking of a photograph.

Figure 5:
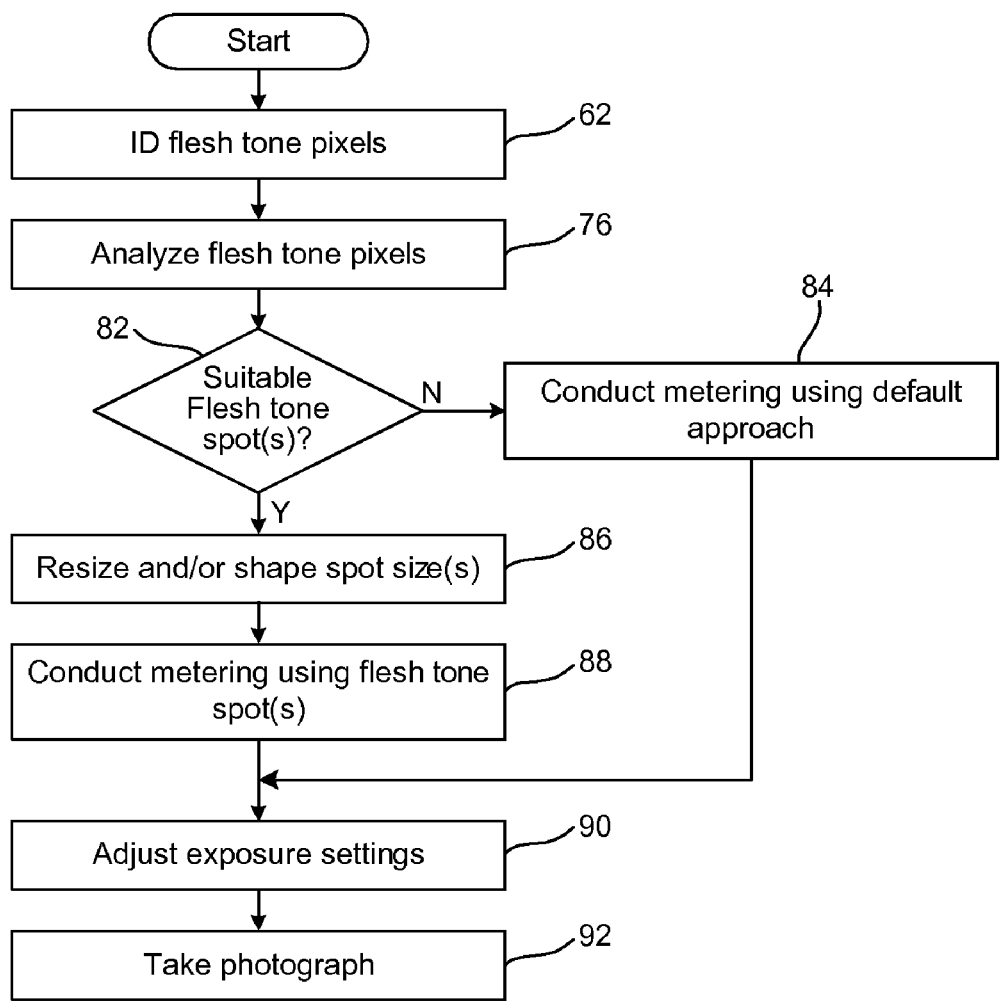
FIG. 5 is a flow chart representing an exemplary method of camera metering in accordance with the present invention.
Figure 6:
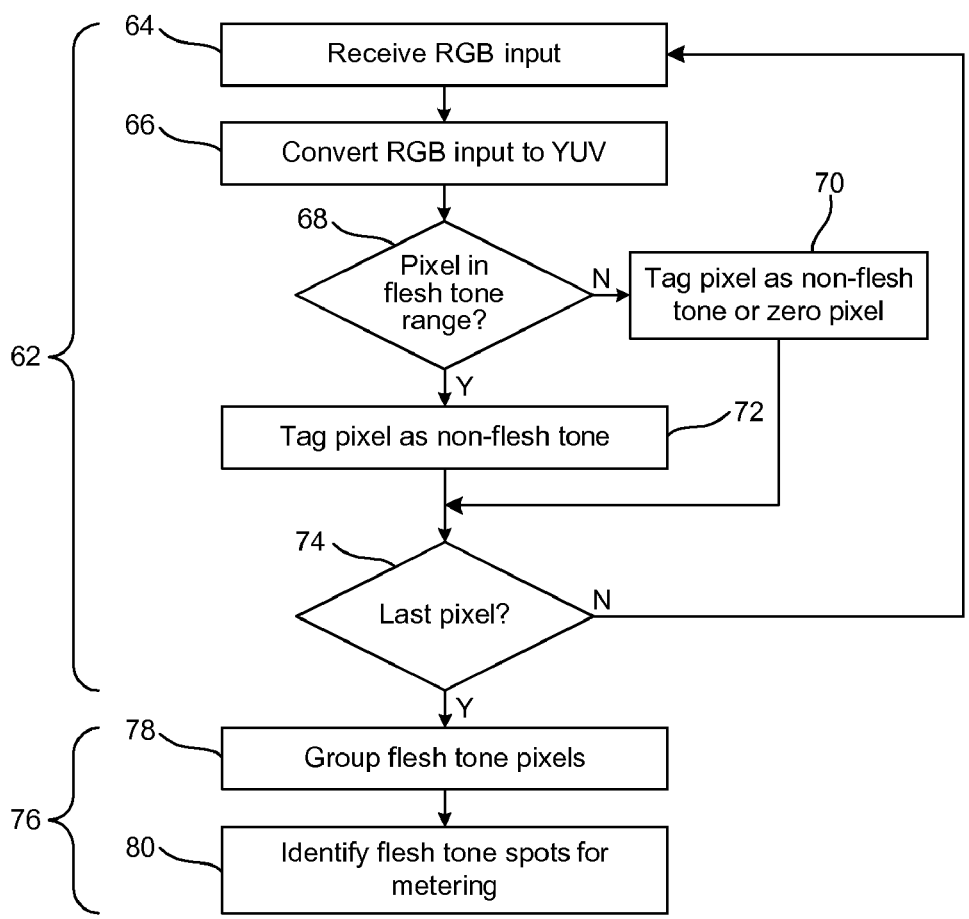
FIG. 6 is a flow chart representing flesh tone pixel identification and flesh tone pixel analysis components of the method of FIG. 5.

With additional reference to FIGS. 5 and 6, illustrated are logical operations to implement an exemplary method of camera metering based on flesh tone detection. The exemplary method may be carried out by executing code with the controller 52, for example. Thus, the flow charts of FIGS. 5 and 6 may be thought of as depicting steps of a method carried out by the camera assembly 12. Although FIGS. 5 and 6 show specific orders of executing functional logic blocks, the order of executing the blocks may be changed relative to the order shown. Also, two or more blocks shown in succession may be executed concurrently or with partial concurrence. Certain blocks also may be omitted. In addition, any number of functions, logical operations, commands, state variables, semaphores or messages may be added to the logical flow for purposes of enhanced utility, accounting, performance, measurement, troubleshooting, and the like. It is understood that all such variations are within the scope of the present invention.

The logical flow for the method of camera metering based on flesh tone detection may begin in block 62 where pixels having a flesh tone are identified. A detailed approach to flesh tone pixel identification is shown in FIG. 6. The illustrated approach sequentially determines if each pixel has a flesh tone or not, but it will be understood that the determination may be made for multiple pixels simultaneously. The logical flow for flesh tone pixel determination may begin in block 64 where a value set for the pixel is received. For instance, the sensor 54 may output a red, green, blue (RGB) value set for the pixel that is input to the controller 52.

In block 66, the RGB value set for the pixel may be converted into a CIE color chart (or color space) value. For instance, the RGB value set may be converted to a YUV value set. The YUV values relate to a coordinate system of color charting where the Y value is indicative of luminance (brightness) and the U and V values represent chrominance (color) components, or points on an XY-style color plane. An upper right hand quadrant of the plane (positive values for both U and V) generally includes purples, a lower right hand quadrant of the plane (positive value for U and negative value for V) generally includes blues, an upper left hand quadrant of the plane (negative value for U and positive value for V) generally includes reds, oranges and yellows, and a lower left hand quadrant of the plane (negative values for both U and V) generally includes greens, but these colors tend to blend together across the plane. Conversion from RGB to YUV and back from YUV to RGB may be made using linear expressions. For instance, using known values for RGB, equations 1 through 3 may be solved to derive YUV values.

$$Y = 0.30R + 0.59G + 0.11B \quad\quad \text{Eq. 1}$$

$$U = 0.70R - 0.59G - 0.11B \quad\quad \text{Eq. 2}$$

$$V = -0.3R - 0.59G + 0.89B \quad\quad \text{Eq. 3}$$

The U and V values have no luminance component. If the values for R, G and B are all the same, a grey color would be defined and the corresponding U and V vales would be zero. Also, changing the value of Y does not change the color and changing the color does not change the brightness. Other color space systems use Yxy coordinates where Y is luminance and x and y represent color on a tilted, parabolic-shape color space chromaticity diagram in which an outer curved portion is a spectral (or monochromatic) locus. The techniques described herein may be modified to use a Yxy representation of the value set for the pixel instead of a YUV representation. It is noted that YUV color representations may be dependent on the particular sensor 54 included in the camera assembly 12 and the conversion between luminance and color may be adjusted for the specific camera assembly 12.

In block 68, a determination may be made as to whether the pixel corresponds to a flesh tone portion of the image. For instance, if Y has a maximum value of 255, representative flesh tones may have YUV values of 188, 42, −32 or 152, 22, −27. In one embodiment, if the UV values for a pixel are located in a predetermined rectangular portion of UV plane, the pixel may be determined to be associated with a flesh tone. For instance, flesh tones may be defined as having a U value between 21 and 43 and a V value between −22 and −33. In another embodiment, the portion of the UV plane associated with flesh tones may be a non-rectangular shape, such as an ellipse or a set of continuous rectangles that approximate an ellipse. For instance, the flesh tone may be associated with one or more just noticeable differences (JNDs) centered on a certain UV coordinate. For instance, if a Yxy color value were used, an ellipse size of five JNDs (5×JND) centered on an xy coordinate of 0.37, 0.27 may be used to determined the flesh tones. The values contained within the JND region(s) may be obtained from a variety of publicly available sources. The range of values associated with flesh tones for purposes of driving camera metering may be adjusted for a specific camera assembly (e.g., to account for variations in sensor construction) and/or a specific camera consuming market.

As will be appreciated by one of skill in the art, flesh tone pixels may be identified for almost all humans, regardless of race, based on the forgoing technique. That is, people of European descent, African descent and Asian descent generally have the same skin coloration, but a different amount of pigmentation. The UV and xy color valuing schemes may be used to detect skin tone without being impacted by pigmentation level. It is noted, however, that an overexposed image of skin or an underexposed image of skin may not be identified as having a flesh tone. For instance, overexposed skin of a Caucasian subject may have a YUV value of 253, −2, −2, where there is a maximum Y value of 255. Thus, bright reflections off of skin and heavily shadowed portions of skin may not generate a positive determination in block 68. As will become more apparent below, the exclusion of such pixels from flesh tone areas can lead to driving spot metering based on one or more identifiable flesh tone spots and a corresponding improvement in establishing exposure settings for the illumination conditions.

If a negative determination is made in block 68, the logical flow may proceed to block 70 where the pixel is tagged as not having a flesh tone. Alternatively, the pixel may be "zeroed" such as by setting the luminance and color values for the pixel to represent all black. If a positive determination is made in block 68, the logical flow may proceed to block 72 where the pixel is tagged as having a flesh tone. It will be recognized that the pixel may be associated with the skin of a person or with a similarly colored object. Subsequent processing is used to identify potential body part structures that may be useful in driving metering of the field of view of the camera assembly 12.

Following blocks 70 and 72, the logical flow may proceed to block 74 where a determination is made as to whether the last pixel from the output of the sensor 54 has undergone the flesh tone pixel identification process of block 62. In one embodiment, all pixels from the field of view of the camera assembly 12 are subject to the flesh tone pixel identification process. In another embodiment, a selected set of pixels are subject to the flesh tone pixel identification process. For instance, it is contemplated that most users will tend to center human subjects in photographs. According, portions of the field of view outside the center region of the field of view of the camera assembly 12 may be ignored in the flesh tone pixel identification process and in the subsequent flesh tone pixel analysis described below. If a negative determination is made in block 74, the logical flow may return to block 64. If a positive determination is made in block 74, the logical flow may proceed to a flesh tone pixel analysis portion of the methodology.

With continued reference to FIGS. 5 and 6, once the flesh tone pixels are identified in block 62, the logical flow may proceed to block 76 where the flesh tone pixels are analyzed. A detailed approach to flesh tone pixel analysis is shown in FIG. 6. The analysis determines if one or more groups of flesh tone pixels should be used to drive metering of the field of view of the camera assembly 12, thereby leading to the establishment of exposure settings.

The logical flow for flesh tone pixel analysis may begin in block 78 where the pixels that were identified as having a flesh tone in block 72 are grouped. The groupings may be established by associating each flesh tone pixel with any other flesh tone pixels that are less than a specified distance away. Groups larger than the specified distance may be established due to multiple associations for some of the pixels. The area occupied by the group need not be continuous (e.g., the area of the group may contain pixels that do not have a flesh tone).

Each group may have an associated shape. Portions of a subject's body may not have clearly defined shapes, but nevertheless occupy an area of the field of view of the camera assembly 12 that is loosely identifiable as a common shape. For instance, a face may have an oval shape, a limb (e.g., an arm or a leg) that is not covered by clothing may have an elongated shape, a torso that is not covered by clothing may have a rectangular shaped, a torso portion exposed by a "V" shaped neck line of clothing may have a triangular shape, and so forth. Also, pixels corresponding to an inanimate object that has a flesh tone may have a geometric shape corresponding to the object.

In block 80 the groups of flesh tone pixels may be assessed against each other and/or against identification criteria to identify one of more flesh tone spots that may be used to drive camera metering. Flesh tone pixels that stand alone or are grouped with less than a threshold number of other flesh tone pixels (e.g., a threshold of about 20 pixels) may be ignored as being associated with an area that is too small to represent a part of human subject that is appropriate for driving camera metering. In one embodiment, groups of flesh tone pixels that have a clearly defined geometric shape (e.g., as defined by straight perimeter lines or uniform curves) may be ignored as likely being associated with an area that corresponds to an inanimate object.

A group of flesh tone pixels that includes other tones may remain in the analysis to accommodate for eyes, lips, teeth, facial hair, makeup, jewelry and so forth. In one embodiment, if an area that includes a group of flesh tone pixels has a percentage of pixels above a predetermined threshold, then a conclusion may be made that a part of a person or persons is located in the corresponding spot of the field of view of the camera assembly 12. In one embodiment, the threshold may be 50 percent. In another embodiment, the threshold may be 60 percent. In another embodiment, the threshold may be 70 percent and, in one other embodiment, the threshold may be 80 percent. A group of pixels having less than the threshold percentage of flesh tone pixels may be ignored or given less weight than a flesh tone spot for purposes of camera metering.

Remaining groups of pixels may be analyzed to select one or more groups to use in the camera metering. For example, a preference may be made for flesh tone area located closest to the center of the field of view of the camera assembly 12. Flesh tone groups located closest to the center may be given higher weight than other flesh tone areas for purposes of metering, or the more distal groups may be ignored during metering. As another example, a preference for faces may be made over limbs and torsos. In this embodiment, an assumption may be made that people in a photograph are right-side-up and a group (or groups) of pixels located above another group (or groups) of pixels may be selected for use in the camera metering. Another technique for setting a preference for faces over limbs and torsos is to select generally oval shaped groups over other shaped groups. In one approach, the groups not associated with faces under these techniques may be ignored for metering purposes or, in another approach, the groups not associated with faces under these techniques may be included in the metering but given less weight than groups associated with faces.

As the exemplary techniques indicate, the identification process of block 80 may reduce the number of flesh tone groups to use in the camera metering and/or establish a rank of weights to be given to each group. In another embodiment, all pixels or all pixels associated with a group of over a threshold number of pixels may be used in the metering regardless of relative size, shape, location, percentage of flesh tone, etc. In any of these approaches, if more than one flesh tone spot is identified, one of the flesh tone spots may be selected for use in the camera metering, some of the flesh tone spots may be selected for use in the camera metering or all of the flesh tone spots may be selected for use in the camera metering. As indicated, if multiple flesh tone spots are to be used in the camera metering, the flesh tone spots may be given different metering weights depending on their relative size, shape and/or location.

Returning to the flow chart of FIG. 5, the logical flow may proceed to block 82 where a determination is made as to whether any flesh tone spots identified through the analysis of block 76 are suitable for use in camera metering. If a negative determination is made, the logical flow may proceed to block 84 where camera metering may be carried out using a default approach, such as conventional spot metering and/or area metering.

If a positive determination is made in block 82, the logical flow may proceed to block 86 where the flesh tone spot or spots for use in the camera metering are resized and/or shaped. The resizing and/or reshaping may be used to configure the arrangement of the spot(s) to facilitate processing associated with the metering. For instance, a rectangle or other polygon may be easier to process than an irregular shape associated with a flesh tone spot. Also, the spot(s) may be reduced in area (e.g., by about 5 percent to about 15 percent) to eliminate pixels at the perimeter edge of the spot(s). In this manner, the edges of the spot(s) are ignored for metering. This may compensate for the fact that color resolution of many cameras is not as good as luminance detection. Thus, at the edges of a face there may be a slow color transition to flesh tones and eliminating the edges of flesh tone spots would result in a spot have a more precise overlap with a portion of the subject's skin that has illumination qualities desirable in driving the camera metering.

Next, in block 88, camera metering based on the identified flesh tone spots may be carried out. For instance, a spot metering technique may be employed. In the spot metering, illumination levels across the entire field of view of the camera assembly 12 (or a portion of the field of view) may be monitored. The illumination levels are integrated together to assess the illumination conditions. During the integration of illumination levels, the identified flesh tone spot(s) are given greater weight than non-flesh tone regions. Such spot metering may be combined with an area metering technique. As will be appreciated, the illumination associated with the flesh tone spot(s) influences the results of the metering. Thus, the result of the metering may more accurately represent the illumination conditions associated with the portion of the photograph having the user's principal interest (e.g., people in the camera's field of view) than if a predetermined spot used for conventional spot and/or area metering techniques has been used.

Following blocks 84 and 88 (depending on the outcome of block 82) the logical flow may proceed to block 90 where the results of the metering may be used to adjust exposure settings. Exemplary exposure settings that may be adjusted in response to the metering may include whether or not to use the flash 60 and, if so, the flash intensity (if adjustable), f-stop, shutter speed and so forth.

In one embodiment, the exposure setting adjustment may be made to meet certain criteria so that the luminance value extremes are not too dark or too light. For instance, not more than a predetermined percentage of flesh tone pixels should have a luminance value over a predetermined upper luminance threshold and not more than a predetermined percentage of flesh tone pixels should have a luminance value under a predetermined lower luminance threshold. In other words, a predetermined percentage of flesh tone pixels should have a luminance value after exposure setting adjustment between the upper and lower luminance thresholds. In one example, for a 24-bit image where the maximum value of Y is 255 and a minimum value is zero, not more than five percent of flesh tone pixels should have luminance values of greater than 225 and not more than twenty-five percent of flesh tone pixels should have luminance values of less than 80. In some circumstances, if one or both of these criteria were exceeded there is a probability that there were a significant number of pixels associated with human skin that were not identifiable in block 68 since those pixels were either over-saturated (e.g., having too much reflectance so as to loose flesh tone color) or under-saturated (e.g., having too little reflectance so as to loose flesh tone color).

In addition, a limit to the amount of change in luminance caused by adjustment to the exposure settings may be imposed. The limit may minimize the adjustments from saturating or darkening the flesh tone spots and/or the picture average beyond a certain amount since the color information used for flesh tone identification would be lost if the exposure becomes excessively light or dark.

In one embodiment, an iterative process may be employed as part of the exposure setting adjustment. For instance, incrementing exposure settings upward until flesh tone saturation is detected may be employed to find an optimum exposure setting. In one approach, when a user depresses or releases a shutter control button to command the taking a photograph, the process may begin with exposure settings that result in low picture brightness. Then, the exposure settings may be incrementally adjusted to increase brightness. For each increment (or step) flesh tone spots may be identified as described above and metering may be carried out. When a predetermined percentage of previously detected flesh tone pixels shift toward saturation, the incrementing may end. In one implementation, after the incrementing ends, the exposure settings may be backed off to slightly darken the picture relative to the exposure settings that resulted in flesh tone saturation detection (e.g., the exposure settings may be reversed by one or more increments). This incremental approach increases the number of flesh tone pixels in the image that are used in the metering process and reduces the possibility that flesh tone pixels will not be identified due to glare. Preferably, the iterative exposure setting adjustment process may be completed before the camera assembly 12 is moved by the user resulting in a change in the field of view of the camera assembly 12 and/or the human subjects in the field of view move a significant amount.

After the exposure settings are adjusted, a photograph may be taken in block 92.

In the methods described herein, flesh tone identification is used to weight spot metering. As a result, exposure settings may be driven to optimally place flesh tones in the dynamic range of the camera assembly 12. In this manner, faces and other areas associated with people appearing in the field of view of the camera assembly 12 may have the a higher degree of detail in resulting photographs than other objects in the field of view, such as background and/or foreground objects. As a result, the user may take photographs having people that are well imaged without manual adjustment of exposure settings and/or without post-processing of the photograph.

In the methods described herein, a search is made for pixels having a color associated with flesh tones and for groups of flesh tone pixels that are indicative of a part of a human subject. These groups of pixels may be used to drive metering and exposure setting adjustment. As will be appreciated, one or more flesh tone spots that are given higher weight than other portions of the field of view of the camera assembly may be identified by searching through the color space of all or part of the field of view to find pixels in a certain color range that combine to have sufficient area and/or location in the field of view to be probable representations of a human subject. As a result, a preferred spot or spots may be identified to guide a spot metering and exposure setting adjustment process.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A method of adjusting exposure settings for a digital camera, comprising:
   searching at least a portion of the field of view of the camera for individual pixels having a flesh tone;
   analyzing the flesh tone pixels to identify at least one flesh tone spot, the at least one flesh tone spot identified by:
      establishing flesh tone groups by associating each flesh tone pixel with any other flesh tone pixels that are less than a specified distance away, and
      retaining groups that have an identifiable shape attributable to a portion of a body of a subject;
   conducting spot metering of the field of view of the camera such that at least one flesh tone spot is given greater weight than the rest of the field of view; and
   adjusting the exposure settings based on the spot metering.

2. The method of claim 1, wherein the analyzing of the flesh tone pixels includes assessing a group of flesh tone pixels against at least one other group of flesh tone pixels to identify a flesh tone spot to drive camera metering.

3. The method of claim 1, wherein an area of the flesh tone spot has at least a threshold percentage of flesh tone pixels.

4. The method of claim 1, further comprising reducing the size of the flesh tone spot prior to conducting the spot metering.

5. The method of claim 1, further comprising converting an RGB output of a sensor that images the field of view to a coordinate-based color value for each pixel.

6. The method of claim 1, wherein the flesh tone is defined by a predetermined portion of a coordinate-based color space.

7. The method of claim 6, wherein the predetermined portion of the coordinate-based color space is elliptical.

8. The method of claim 7, wherein the elliptical portion of the coordinate-based color space is approximated with a set of rectangles.

9. The method of claim 1, further comprising iteratively adjusting the exposure settings from darker to lighter until flesh tone saturation is detected.

10. The method of claim 9, further comprising, upon detection of flesh tone saturation, reversing at least a portion of the iterative adjustments.

11. A camera comprising:
   a sensor for imaging a field of view and outputting a signal indicative of luminance and color for a plurality of pixels; and
   a controller that adjusts exposure settings of the camera by identifying which individual pixels have a flesh tone from at least a portion of the field of view, analyzing the flesh tone pixels to identify at least one flesh tone spot, the at least one flesh tone spot identified by establishing flesh tone pixel groups by associating each flesh tone pixel with any other flesh tone pixels that are less than a specified distance away, and retaining groups that have an identifiable shape attributable to a portion of a body of a subject, conducting spot metering of the field of view such that at least one flesh tone spot is given greater weight than the rest of the field of view and adjusting the exposure settings based on the spot metering.

12. The camera of claim 11, wherein the controller executes logical instructions to adjust the exposure settings.

13. The camera of claim 11, wherein the analyzing of the flesh tone pixels by the controller includes grouping the flesh tone pixels by relative proximity to each other.

14. The camera of claim 11, wherein an area of the flesh tone spot has at least a threshold percentage of flesh tone pixels.

15. The camera of claim 11, wherein the controller reduces the size of the flesh tone spot prior to conducting the spot metering.

16. The camera of claim 11, wherein the output of the sensor has an RGB value set for each pixel and the controller converts the RGB output of a sensor to a coordinate-based color value for each pixel.

17. The camera of claim 11, wherein the flesh tone is defined by a predetermined portion of a coordinate-based color space.

18. The camera of claim 11, wherein the controller iteratively adjusts the exposure settings from darker to lighter until flesh tone saturation is detected.

19. The camera of claim 18, wherein, upon detection of flesh tone saturation, the controller reverses at least a portion of the iterative adjustments.

20. The camera of claim 11, wherein the camera forms part of a mobile radio terminal having a radio circuit for establishing a call over a communications network.

* * * * *